(12) United States Patent
Taniuchi

(10) Patent No.: US 6,179,455 B1
(45) Date of Patent: Jan. 30, 2001

(54) AUTOMOBILE HEADLIGHT

(75) Inventor: Hitoshi Taniuchi, Tokyo (JP)

(73) Assignee: Stanley Electric Co., Ltd., Tokyo (JP)

( * ) Notice: Under 35 U.S.C. 154(b), the term of this patent shall be extended for 0 days.

(21) Appl. No.: 09/285,786

(22) Filed: Apr. 5, 1999

(30) Foreign Application Priority Data

Apr. 27, 1998 (JP) .................................................. 10-116989
Aug. 21, 1998 (JP) .................................................. 10-235609

(51) Int. Cl.$^7$ ...................................................... B60Q 1/06
(52) U.S. Cl. ........................... 362/507; 362/464; 362/465; 362/466; 362/467; 362/512; 362/513; 362/282; 362/280
(58) Field of Search .................................... 362/464, 465, 362/466, 467, 512, 513, 507, 282, 280

(56) References Cited

U.S. PATENT DOCUMENTS

| | | | |
|---|---|---|---|
| 4,639,839 | * | 1/1987 | Miyazawa ................................ 362/64 |
| 5,707,129 | * | 1/1998 | Kobayashi .............................. 362/66 |
| 5,899,559 | * | 5/1999 | Lachmayer et al. ................. 362/513 |
| 5,988,837 | * | 11/1999 | Eichorn et al. ....................... 362/464 |
| 6,012,830 | * | 1/2000 | Frazier ................................. 362/539 |
| 6,024,472 | * | 2/2000 | Tseng .................................. 362/467 |
| 6,059,428 | * | 5/2000 | Perlo et al. .......................... 362/268 |
| 6,059,435 | * | 4/2000 | Hamm et al. ........................ 362/514 |
| 6,102,557 | * | 8/2000 | Kaneda ................................ 362/507 |
| 6,109,759 | * | 8/2000 | Tanabe et al. ......................... 362/42 |

FOREIGN PATENT DOCUMENTS

0863047 A2   9/1998   (EP) .

* cited by examiner

*Primary Examiner*—Sandra O'Shea
*Assistant Examiner*—Anabel M. Ton
(74) *Attorney, Agent, or Firm*—Morgan, Lewis & Bockius LLP

(57) ABSTRACT

An automobile headlight comprising a light source, a reflector having a by-passing reflecting portion, which reflects light emitted from the light source downward to form a light distribution pattern for by-passing, and a traveling reflecting portion, which reflects light emitted from the light source to a horizontal front of the automobile headlight when the movable shade is in a position for traveling straight ahead, a fixed shade which directs light emitted from the light source towards the reflector, a movable shade capable of taking a position P or Q depending on whether the automobile is traveling straight ahead or by-passing another vehicle, and a driving unit connected to the movable shade for changing a position of the movable shade, wherein when the movable shade is in the by-passing position Q, the movable shade suppresses light emitted from the light source towards the traveling reflecting portion and passes light emitted from the light source toward the by-passing reflecting portion, and when the movable shade is in the position P for traveling straight ahead, the movable shade suppresses partly emitted light at an upper end of the by-passing reflecting portion and passes light emitted from the light source toward the traveling reflecting portion and the remaining by-passing reflecting portion. The automobile headlight provides more appropriate light distribution patterns for both traveling straight ahead and by-passing another vehicle, especially for traveling straight ahead. The automobile headlight may further comprise a passing switch for enabling a passing function.

7 Claims, 4 Drawing Sheets

AUTOMOBILE HEADLIGHT

This invention claims the benefit of Japanese Patent Application No. 10-235609, filed on Aug. 21, 1998 and Japanese Patent Application No. 10-116989, filed on Apr. 27, 1998, which are hereby incorporated by reference.

BACKGROUND OF THE INVENTION

1. Field of the Invention

The present invention relates to an automobile headlight, and more particularly to a composition of the automobile headlight having a single fixed light source, a reflector, a fixed shade and a movable shade, characterized in that the fixed shade and the movable shade control light emitted from the light source to the reflector such that a light distribution of the headlight changes depending on whether the automobile is traveling straight ahead or by-passing another vehicle.

2. Discussion of the Related Art

FIG. 7 illustrates a conventional automobile headlight 90 comprising a light source 91, a reflector 92, a fixed shade 93, a movable shade 94 capable of taking a by-passing position or a traveling position depending on whether an automobile is traveling straight ahead or by-passing another vehicle, and a driving unit 95 to change a position of the movable shade 94. The reflector 92 further comprises a by-passing reflecting portion 92a, which reflects light emitted from the light source 91 when the movable shade 94 is in a by-passing position, having a rotated parabolic surface with a focus f1 positioned backward of the light source 91 in an illuminating direction, and a traveling reflecting portion 92b, which reflects light emitted from the light source 91 when the movable shade 94 is in a traveling position, and having a rotated parabolic surface with a focus f2 on the light source 91. The traveling reflecting portion 92b is around an upper end of the reflector 92 when the headlight 90 is disposed in the automobile. The fixed shade 93 prohibits light emitted from the light source 91 directly into an illuminating direction, and also prohibits emitted light toward a portion of the reflector 92. Reflected light at the portion of the reflector 92 forms unnecessary light distribution patterns. The movable shade 94 is moved by a driving unit 95 like a solenoid, and takes a traveling position P or by-passing position Q depending on whether the automobile is traveling straight ahead or passing by another vehicle. When the movable shade 94 is in the Q position, the movable shade 94 prohibits light emitted from the light source 91 towards the traveling reflecting portion 92b, thereby providing a light distribution pattern S for by-passing comprising light emitted downward from the reflecting portion 92a as depicted in FIG. 8. When the movable shade 94 is in the P position, as depicted by broken lines in FIG. 7, the movable shade 94 partially covers the fixed shade 93. Light emitted from the light source 91 thus reaches the traveling reflecting portion 92b, thereby providing a light distribution pattern M for traveling straight ahead, which comprises a light distribution pattern M2 that is light reflected on the traveling reflecting portion 92b toward the horizontal far front of the automobile headlight 90, and also provides the light distribution pattern S for by-passing, which comprises downward light reflected on the by-passing reflecting portion 92a. The light distribution pattern M is a combination of the light distribution patterns M2 and S.

The conventional automobile headlight 90 has the following problems. Even after a light distribution pattern is changed from by-passing to traveling straight ahead, long distance visibility does not significantly improve because the driver's pupils contract when sensing the downward bright area close to the automobile, which consequently decreases the driver's luminosity. A characteristic of the light distribution pattern S for by-passing, i.e. illuminating a downward bright area in a relatively close range to the automobile, still remains even after the light distribution is changed from the pattern S for by-passing to the pattern M for traveling straight ahead, because the light distribution pattern M for traveling straight ahead is formed by adding the light distribution pattern M2, which comprises light emitted in a horizontal front direction, to the light distribution pattern S comprising light emitted downward in a close range to the automobile.

SUMMARY OF THE INVENTION

The present invention is directed to an automobile headlight that substantially obviates one or more of the above problems due to the limitations and disadvantages of the related art.

An object of the invention is to provide an automobile headlight capable of providing more appropriate light distribution patterns for both traveling straight ahead and by-passing another vehicle.

The above object is achieved by providing an automobile headlight comprising a light source, a reflector having a by-passing reflecting portion, which reflects light emitted from the light source downward to form a light distribution pattern for by-passing, and a traveling reflecting portion, which reflects light emitted from the light source to a horizontal front of the automobile headlight when the movable shade is in a position for traveling straight ahead, a fixed shade which directs light emitted from the light source towards the reflector, a movable shade capable of taking a position P or Q depending on whether the automobile is traveling straight ahead or by-passing another vehicle, and a driving unit connected to the movable shade for changing a position of the movable shade, wherein when the movable shade is in the by-passing position Q, the movable shade prohibits light emitted from the light source towards the traveling reflecting portion and passes light emitted from the light source toward the by-passing reflecting portion, and when the movable shade is in the position P for traveling straight ahead, the movable shade prohibits partly emitted light at an upper end of the by-passing reflecting portion and passes light emitted from the light source toward the traveling reflecting portion and the remaining by-passing reflecting portion, thereby an improved light distribution pattern for traveling straight ahead is achieved.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION OF THE PREFERRED EMBODIMENTS

Reference will now be made in detail to the preferred embodiments of the present invention. Whenever possible, the same reference numbers will be used throughout the drawings to refer to the same or like parts.

Figure 1:
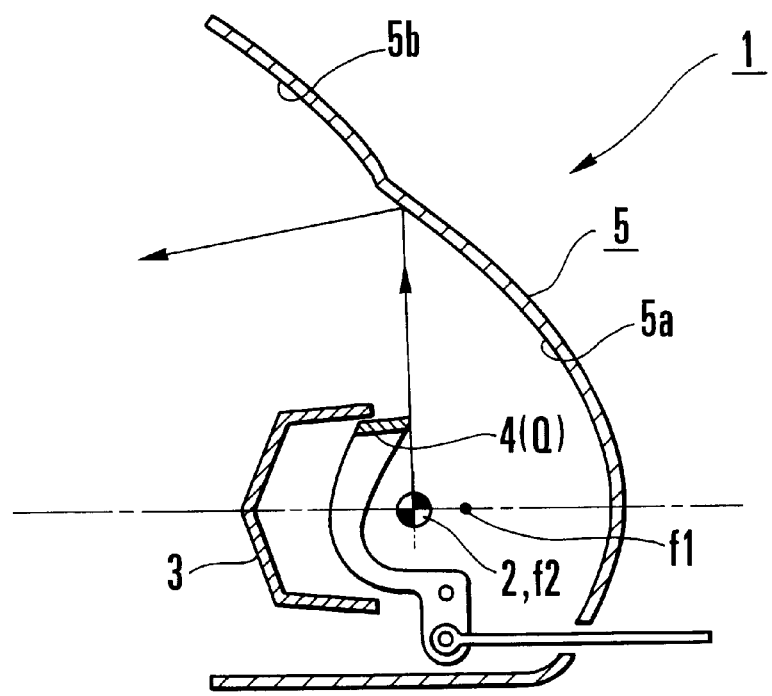
FIG. 1 illustrates a cross-sectional view of a first preferred embodiment of the present invention when it forms a light distribution pattern for by-passing another vehicle.

FIG. 1 illustrates a cross-sectional view of the first preferred embodiment of the present invention. An automobile headlight 1 comprises a light source 2, a reflector 5 having a by-passing reflecting portion 5a, which reflects light emitted from the light source 2 downward to form a light distribution pattern S for by-passing, and a traveling reflecting portion 5b, which reflects light emitted from the light source 2 to a horizontal front of the automobile headlight 1 when the movable shade 4 is in a position for traveling straight ahead, a fixed shade 3, a movable shade 4 capable of taking a traveling position P or by-passing position Q depending on whether the automobile is traveling straight ahead or by-passing another vehicle, and a driving unit such as a solenoid or the like, not illustrated herein, connected to the movable shade 4 for changing a position of the movable shade 4. The by-passing reflecting portion 5a has a rotated parabolic surface with a focus f1 positioned backward of the light source 2 in an illuminating direction. The traveling reflecting portion 5b is around an upper end of the reflector 5 when the headlight 1 is disposed in the automobile, and also has a rotated parabolic surface with a focus f2 on the light source 2. The fixed shade 3 prohibits light emitted from the light source 2 from entering directly into an illuminating direction and also prohibits an unnecessary portion of reflected light from the reflector 5 to form the light distribution patterns.

Figure 2:
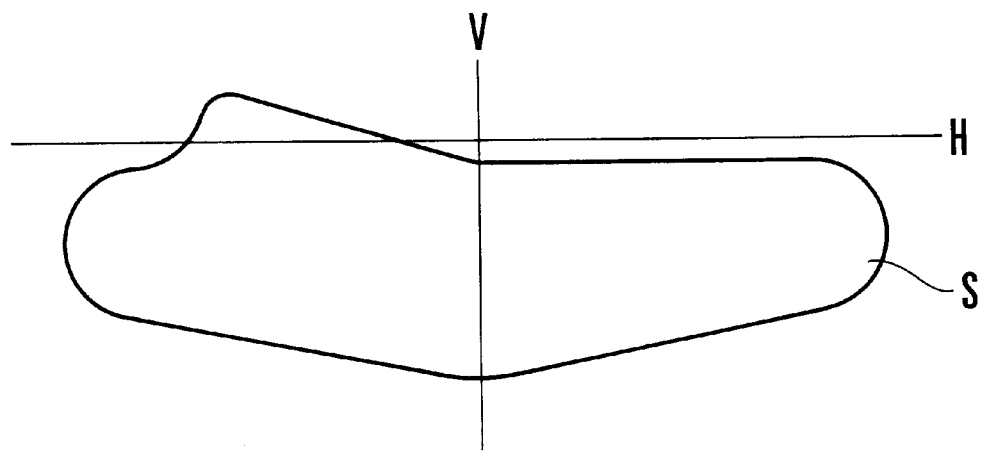
FIG. 2 illustrates a light distribution pattern S for by-passing of the first preferred embodiment of the present invention.

FIG. 2 illustrates a light distribution pattern S emitted from the automobile headlight 1 for driving in the left lane when passing by another vehicle on the right side. In order to prevent dazzling a driver in an on-coming lane, all light emitted upward is suppressed from the automobile headlight 1 except light emitted toward a left gore area allowing the driver to recognize a road sign. Alternately, the light distribution pattern could be configured for driving in the right lane when passing by another vehicle on the left side. Additionally, in order to help a driver recognize the road surface in a close range ahead of the automobile, the light distribution pattern S includes relatively intense light directed downward. The light distribution pattern S does not substantially differ between the automobile headlight 1 and the conventional automobile head light 90 in its shape and distribution of luminous flux density, which are determined to conform with legal restrictions.

Figure 3:
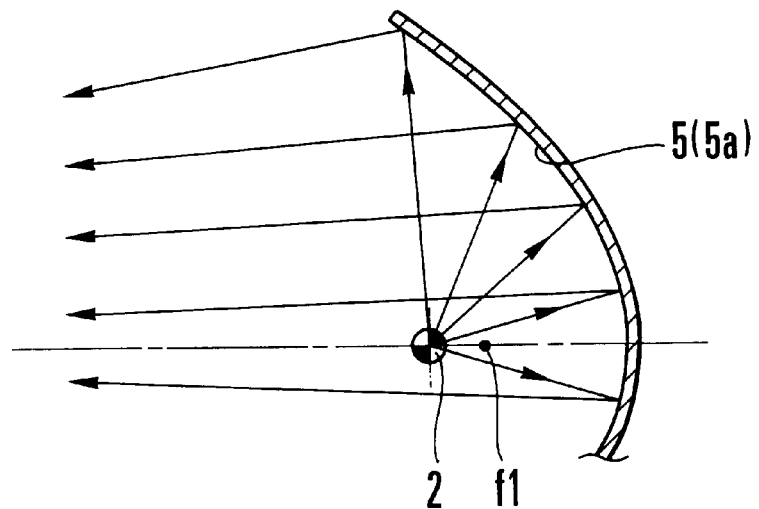
FIG. 3 is a diagram to illustrate directions of light rays reflected on the by-passing reflecting portion of the reflector.

FIG. 3 illustrates the relationship between reflected light direction, and positions of light source 2, the by-passing reflecting portion 5a of the reflector 5, and a focus f1 of the parabolic surface of the by-passing reflecting portion 5a. The focus f1 is backward from the light source 2. Light reflected from the by-passing reflecting portion 5a around a portion horizontal to the light source 2 is directed horizontal front. As a reflecting point on the by-passing reflecting portion 5a moves upward relative to the light source 2, the direction of reflected light becomes gradually downward. Accordingly, light reflected on the upper end of the by-passing reflecting portion 5a illuminates the road surface in close range to the automobile. If the light distribution pattern S for by-passing is changed to a light distribution pattern M for traveling straight ahead while the light on the road surface in close range to the automobile remains, the driver perceives the road surface in close range to the automobile to be much brighter than actual, although the luminous flux density in the range is low. Consequently, the driver's pupils contract, and luminosity and long distance visibility decrease.

Figure 4:
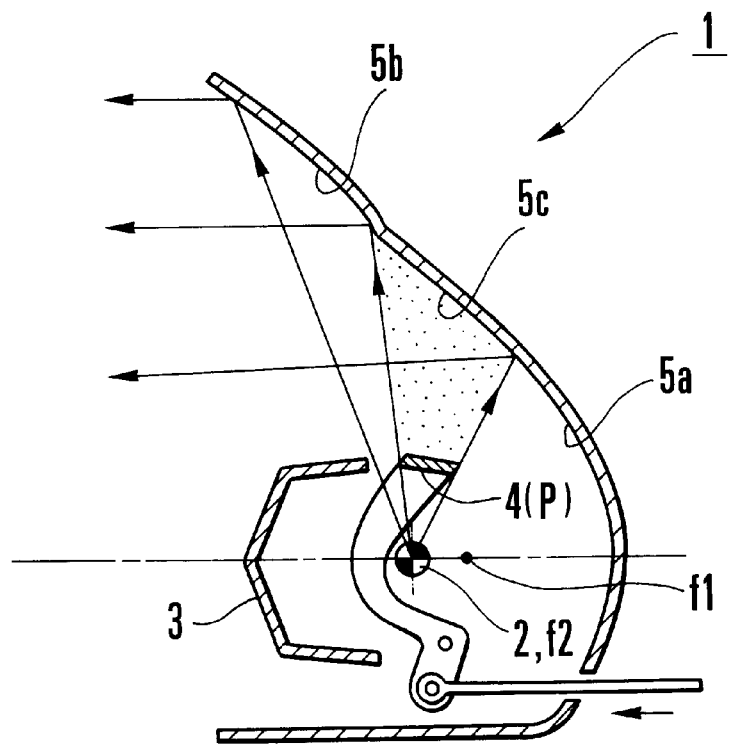
FIG. 4 is a cross-sectional view of the first preferred embodiment of the present invention when it forms a light distribution pattern for traveling straight ahead.

FIG. 4 illustrates a cross-sectional view of the automobile headlight 1 when the movable shade 4 is in the traveling position P and the automobile is traveling straight ahead. The movable shade 4 does not suppress light emitted from the light source 2 towards the traveling reflecting portion 5b, but it does suppress light directed from the light source 2 to an upper end 5c of the by-passing reflecting portion 5a, because light reflected on the upper end 5c of the by-passing reflecting portion 5a is directed more downward than any other portion of the by-passing reflecting portion 5a.

Figure 5:
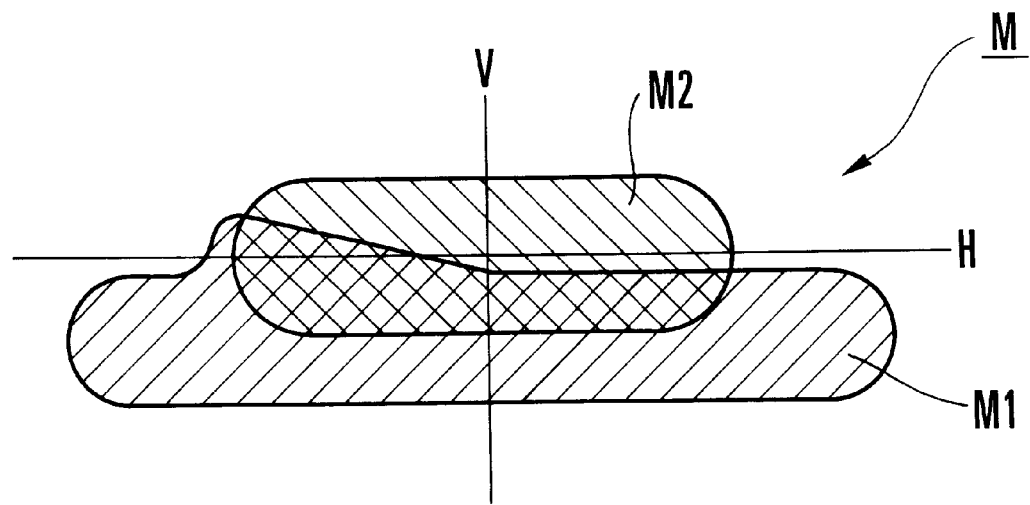
FIG. 5 illustrates a light distribution pattern for traveling straight ahead of the first preferred embodiment of the present invention.

FIG. 5 illustrates a light distribution pattern M for traveling straight ahead comprising reflected light M1 reflected on the by-passing reflecting portion 5a, except the upper end 5c, and reflected light M2 reflected on the traveling reflecting portion 5b. Since the reflected light M1 does not include light reflected on the upper end 5c, which directs light more downward than any other portion of the by-passing reflecting portion 5a, the light distribution pattern M does not include a lower substantially triangular portion of the light distribution pattern S for by-passing, i.e., the road surface that is in a close range to the automobile. Accordingly, this configuration prevents driver's luminosity or long distance visibility from decreasing even when the movable shade 4 is in the traveling position P.

Figure 6:
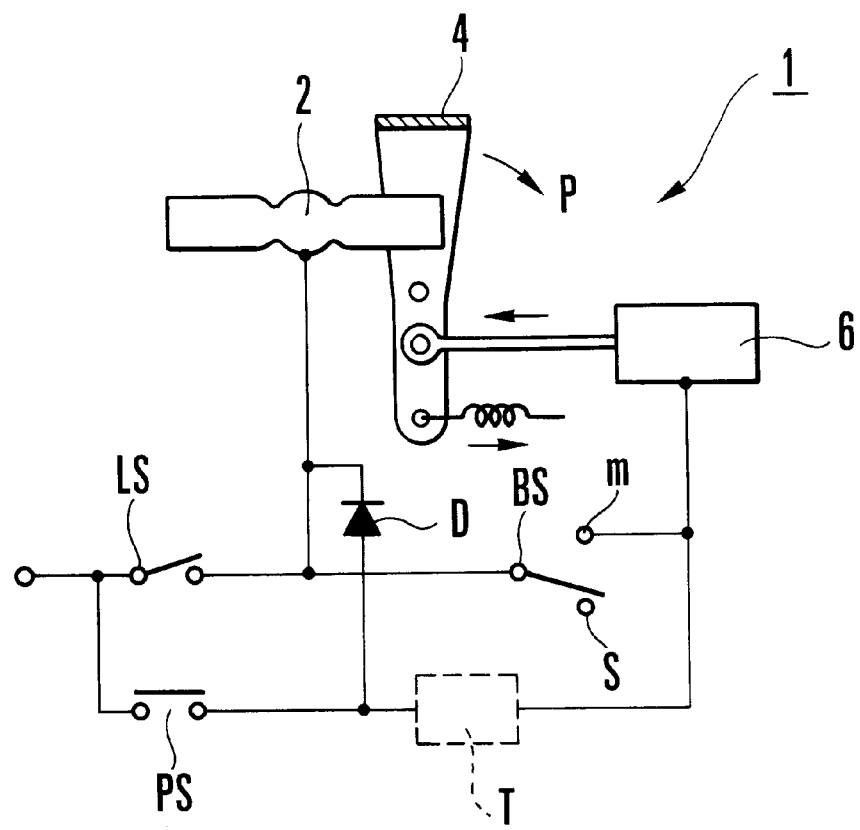
FIG. 6 illustrates a wiring diagram of a second preferred embodiment of the present invention.
Figure 7:
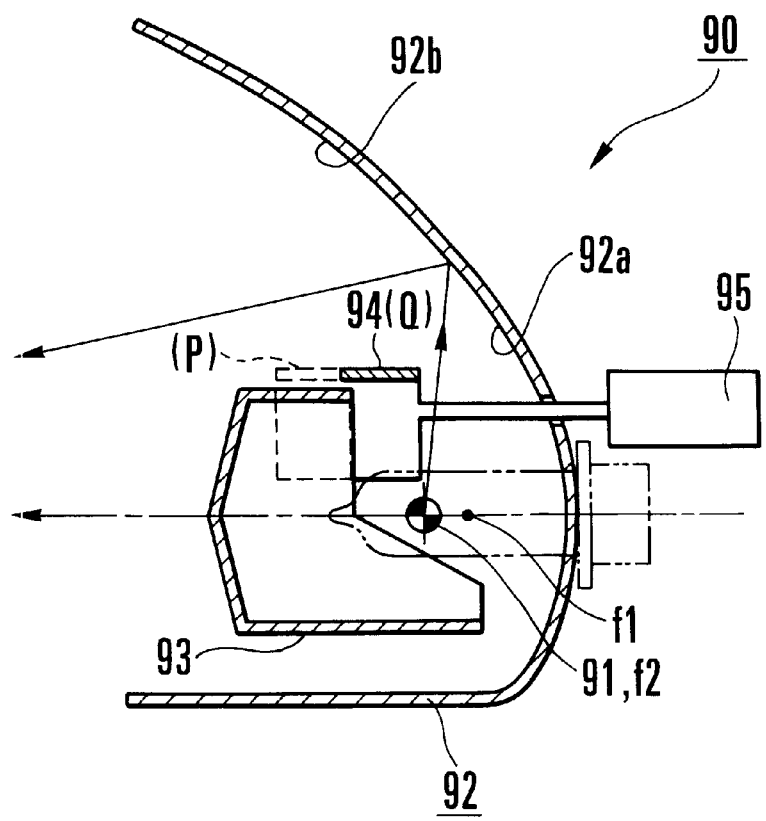
FIG. 7 illustrates a cross-sectional view of a conventional automobile headlight.
Figure 8:
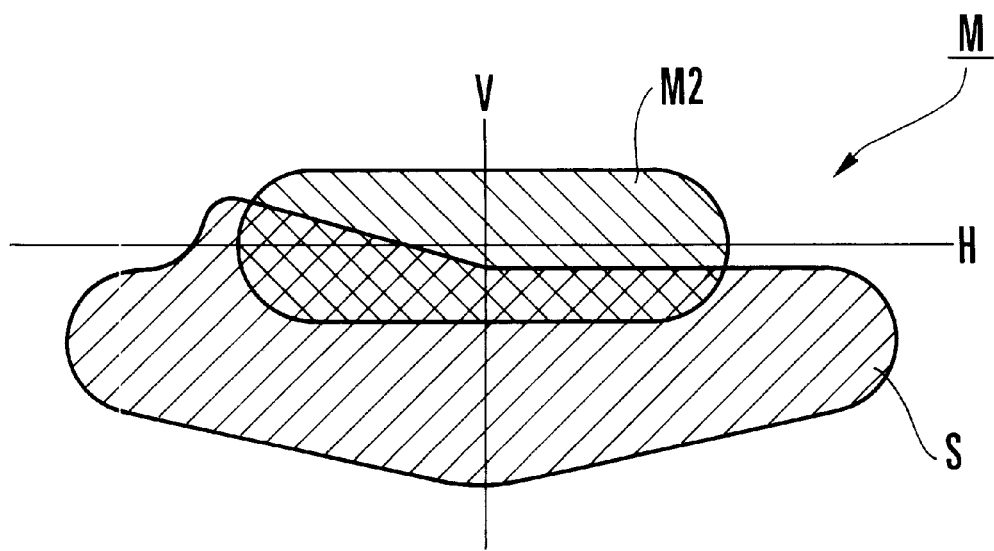
FIG. 8 illustrates a light distribution pattern for traveling straight ahead of the conventional automobile headlight.

FIG. 6 illustrates a wiring diagram of the second preferred embodiment of the present invention for applying a passing function to the automobile headlight 1. The passing function instantly changes the light distribution pattern S for by-passing to the light distribution pattern M or traveling straight ahead, thus notifying a driver's intention to by-pass to another. This wiring enables the automobile headlight 1 to have the passing function because the automobile headlight 1 changes its light distribution pattern by moving the movable shade 4 without adjusting the actual light source 2 or another, and the position of the movable shade 4 is changed by a driving unit, such as a solenoid, which is capable of a quick movement.

The wiring diagram comprises an automobile headlight 1 having a light source 2, a movable shade 4, a solenoid 6 connected to the movable shade 4, a switch BS connected to the solenoid 6 that is capable of changing its terminal between a terminal m for traveling straight ahead and a tenninal s for by-passing another vehicle, a timer T connected to the solenoid 6 for keeping the movable shade 4 in the P position for a predetermined time, a passing switch PS connected through the timer T to the solenoid 6, a lighting switch LS connected parallel to the passing switch PS and in series to the switch BS, and a diode D for preventing current from running to the solenoid 6 while the lighting switch LS is on.

When the passing function is used for passing another vehicle in daytime, since the light source 2 is off, electric power is supplied through the passing switch PS and the diode D to the light source 2 and is also supplied through the passing switch PS and the timer T to the solenoid 6, and thereby the automobile headlight 1 is instantly lighted while the movable shade 4 is in the traveling position P.

The operational advantages of the automobile headlight 1 according to the preferred embodiment of the present invention will now be described. The automobile headlight 1 provides an improved light distribution pattern M for traveling straight ahead, while providing the substantially same light distribution pattern S for by-passing as the conventional one. Light emitted downward and arriving on the road surface in close range to the automobile is required for the light distribution pattern S when by-passing another vehicle to form a lower substantially triangular portion of the light distribution pattern S, but the lower substantially triangular portion of the light distribution S is not required for the light distribution pattern M for traveling straight ahead. The movable shade 4 in the traveling position P suppresses light emitted from the light source 2 to the upper end 5c of the by-passing reflecting portion 5a, which reflects the light to form the lower substantially triangular portion of the light distribution pattern S, while passing the light emitted from the light source 2 toward the traveling reflecting portion 5b and the by-passing reflecting portion 5a, except the upper end 5c, thereby preventing the driver from decreasing luminosity and long distance visibility when the automobile is traveling straight ahead. Additionally, the automobile headlight 1 is applicable for the passing function, by connecting the driving unit 6 to the passing switch PS and the lighting switch LS.

It will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. An automobile headlight comprising:
   a light source;
   a movable shade positionable between a traveling position P and a by-passing position Q, when the automobile is traveling straight ahead and when by-passing another vehicle, respectively;
   a reflector having a by-passing reflecting portion that reflects light emitted from the light source downward to form a light distribution pattern for by-passing, and a traveling reflecting portion which reflects light emitted from the light source when the movable shade is in the position P for traveling straight ahead, the by-passing reflecting portion positioned adjacent the traveling reflecting portion;
   a fixed shade which directs light emitted from the light source towards the reflector, the fixed shade positioned adjacent the light source; and
   a driving unit connected to the movable shade for changing a position of the movable shade, wherein:
      the movable shade in the by-passing position Q suppresses light emitted from the light source towards the traveling reflecting portion and passes light emitted from the light source toward the by-passing reflecting portion; and
      the movable shade in the traveling position P partly suppresses emitted light at an upper end of the by-passing reflecting portion and passes light emitted from the light source toward the traveling reflecting portion and the remaining by-passing reflecting portion.

2. The automobile headlight according to claim 1, wherein the driving unit comprises a passing switch connected to the movable shade for enabling a passing function.

3. An automobile headlight assembly comprising:
   a light source;
   a reflector disposed behind the light source having a first shaped surface and a second shaped surface, such that light emitted from the light source is reflected in different directions depending upon whether the emitted light is exposed to the first shaped surface or the second shaped surface, the first shaped surface disposed adjacent to the second shaped surface;
   a first shade extending in front of the light source that suppresses direct illumination from the light source of the headlight assembly; and
   a second shade that suppresses light emitted from the light source according to whether the automobile is traveling straight ahead or passing by another vehicle, the second shade disposed adjacent the light source; wherein
      the second shade partly suppresses light emitted toward the first shaped surface and passes light emitted toward the second shaped surface when in a first configuration for traveling straight ahead; and
      the second shade suppresses light emitted toward the second shaped surface and passes light emitted toward the first shaped surface when in a second configuration for passing by another vehicle.

4. The automobile headlight assembly according to claim 3, further comprising a driving unit connected to the second shade for changing a position of the second shade.

5. A driving unit for an automobile headlight assembly in an automobile comprising:
   a light source;
   a movable shade;
   a solenoid connected to the movable shade;
   a first switch connected to the solenoid that is capable of changing between a first terminal m for traveling straight ahead and a second terminal s for by-passing another vehicle;
   a timer connected to the solenoid, and connected in parallel to the first switch, for keeping the moveable shade in a first position for a predetermined time;
   a second switch connected through the timer to the solenoid, and connected to a power supply, that allows current to flow to the timer when the automobile is by-passing another vehicle;
   a third switch connected to the power supply, and also connected parallel to the second switch and in series with the first switch, that allows current to flow to the first switch when the light source is to be lit; and
   a diode connected at one end between the timer and the second switch, and at the other end between the third switch and the first switch, for preventing current from running to the solenoid when the third switch is on.

6. The automobile headlight according to claim 1, wherein a portion of the by-passing reflector portion is contiguous with a portion of the traveling reflecting portion.

7. The automobile headlight according to claim 3, wherein a portion of the first shaped surface is contiguous with a portion of the second shaped surface.

* * * * *